United States Patent [19]

Gaiser

[11] 4,373,465
[45] Feb. 15, 1983

[54] VISUAL FLUID LEVEL INDICATOR

[75] Inventor: Robert F. Gaiser, Stevensville, Mich.

[73] Assignee: The Bendix Corporation, Southfield, Mich.

[21] Appl. No.: 193,763

[22] Filed: Oct. 3, 1980

[51] Int. Cl.³ .............................................. G01F 23/02
[52] U.S. Cl. ...................................... 116/227; 73/334
[58] Field of Search ........................ 73/334, 323, 330; 116/227; 303/85; 188/151 A, 1.11; 215/320, 321, 355; 220/307

[56] References Cited

U.S. PATENT DOCUMENTS 3,217,923 11/1965 Price ....................................... 73/334
3,434,346 3/1969 Demyon ................................ 73/334
3,578,200 5/1971 Hetzer ................................. 220/307

FOREIGN PATENT DOCUMENTS 2319008 10/1974 Fed. Rep. of Germany ..... 188/1.11

Primary Examiner—Edward R. Kazenske
Assistant Examiner—Denis E. Corr
Attorney, Agent, or Firm—Paul David Schoenle; Ken C. Decker

[57] ABSTRACT

A transparent plastic plug (60) is attached to a reservoir housing (16) to provide a visual indication of the fluid level within. The housing (16) includes a pair of tabs (46, 48) and the plug (60) includes a pair of resilient projections (76, 78) which cooperate with the tabs (46, 48) to permanently attach the plug to the housing.

1 Claim, 3 Drawing Figures

VISUAL FLUID LEVEL INDICATOR

The invention relates to a visual indicator to check the level of fluid within a container or housing, such as a master cylinder reservoir in a vehicle. Fluid is carried within the housing of a master cylinder reservoir for communication with at least one pressure chamber. During braking the fluid within the one pressure chamber is pressurized to communicate fluid pressure to a brake assembly. Consequently, a continuous source of fluid for the pressure chamber is required to operate the brake assembly.

Heretofore, a light reflective plastic or a glass member with a predetermined geometry has been coupled to a master cylinder housing to provide a visual indication of the fluid level within the housing. In the alternative, a completely plastic reservoir has been provided which is transparent to visually indicate the level of fluid contained within the reservoir. When a metal master cylinder reservoir has been used, a threaded attachment between a transparent plug and the metal wall of the reservoir has required machining of the metal wall to form internal threads. Also with the well-known vibrational characteristics of a vehicle, the threaded attachment is susceptible of disconnection.

The present invention provides a simple transparent plastic plug in combination with a master cylinder reservoir to provide a visual indication of the level of fluid within the reservoir. The reservoir housing includes an outer wall extending from a base to an opening for receiving the fluid. An inner wall cooperates with the outer wall to separate the reservoir into a pair of cavities. The inner wall is integrally formed with the outer wall and defines a pair of intersections with the outer wall. The outer wall forms a pair of integral tabs with undercut recesses at one of the pair of intersections. An outer wall opening between the pair of tabs leads to a passage in the inner wall communicating with the pair of cavities. The transparent plastic plug forms a first diameter portion extending into the outer wall opening and a pair of integrally formed resilient projections are biased into the undercut recesses to attach the transparent plastic plug to the reservoir housing. A resilient sealing ring is disposed between the plug and housing and a bore on the plug receives fluid to provide a visual indication of the fluid level. With the foregoing visual indicator, it is possible to die cast an aluminum reservoir housing with the pair of tabs and the opening in the absence of a machining operation for the die cast aluminum reservoir. Also, the transparent plug is easily inserted into the outer wall opening to lock the projections with the tabs thereby preventing inadvertent disassembly of the plug from the reservoir housing in response to vibration. Consequently, the advantages offered by the invention are a simple visual indicator which is easily combined with a metal reservoir in the absence of additional machining requirements for the metal reservoir.

The attached drawings indicate different ways of carrying out the invention, in which.

Figure 1:
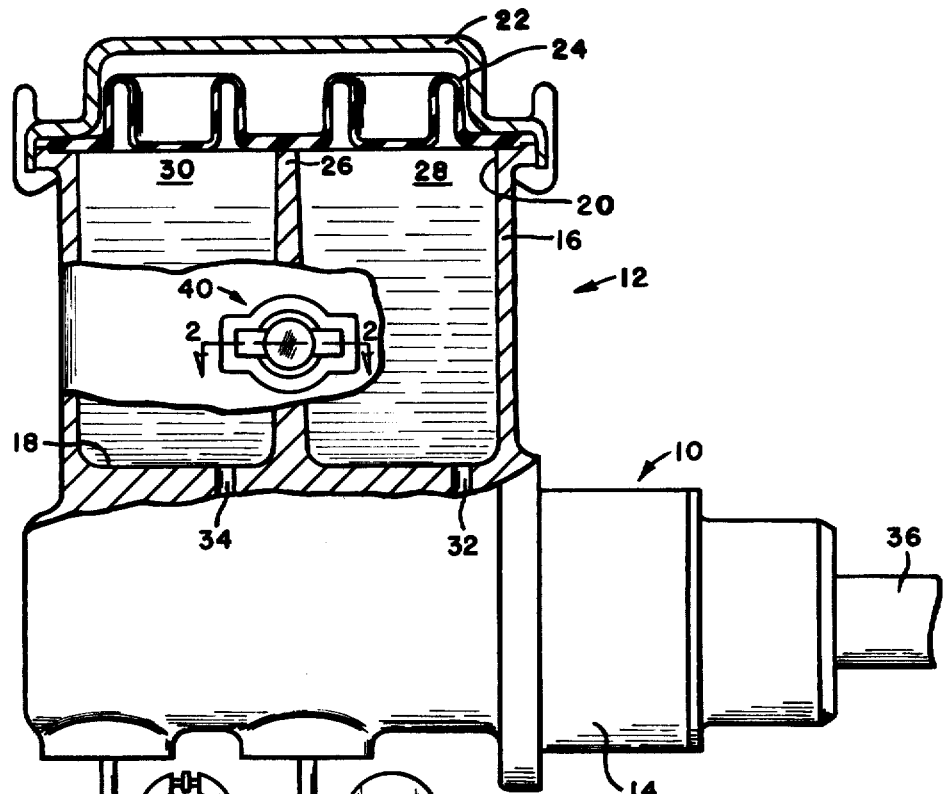
FIG. 1 is a side view of a master cylinder partly in cross section.

In FIG. 1 a master cylinder includes a die cast aluminum housing 10 with an integrally formed reservoir 12 attached to a substantially cylindrical portion 14. The reservoir 12 includes an outer wall 16 extending away from a base 18 to an opening 20. The opening 20 permits filling the reservoir with brake fluid and a cover 22 cooperates with a flexible diaphragm 24 to enclose the opening 20. An inner wall 26 extends from one side of the outer wall to an opposite side of the outer wall and is integrally formed therewith to substantially form a pair of cavities 28 and 30 to store brake fluid therein. A pair of apertures 32 and 34 communicate brake fluid to the cylindrical portion 14 so that upon movement of an input member 36 the brake fluid therein is pressurized to communicate fluid pressure to a pair of brake assemblies associated with each front and rear wheel assembly.

In accordance with the invention, the outer wall 16 is adapted in a manner described hereinafter to receive a visual fluid level indicator 40. The indicator 40 is made from a transparent plastic and is disposed at a peripheral location on the outer wall at an intersection with the inner wall 26.

Figure 2:
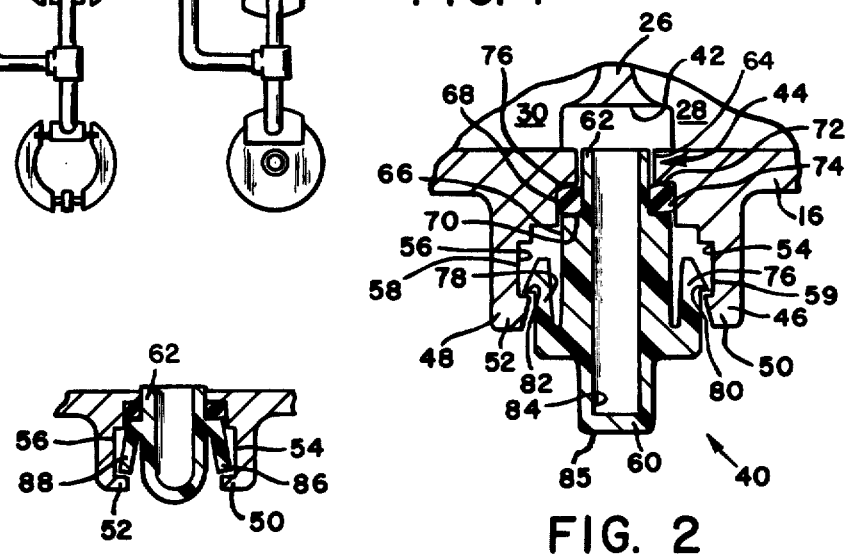
FIG. 2 is a cross-sectional view taken along line 2—2 of FIG. 1.

Turning now to FIG. 2, the intersection of the inner wall 26 with the outer wall 16 is provided with a passage 42 in the inner wall to communicate the cavity 28 with the cavity 30. The outer wall defines an opening 44 leading to the passage 42. A pair of integrally formed tabs 46 and 48 extend transversely from the outer wall 16. Each tab forms one enlarged head 50 and 52, respectively, defining under cut recesses 54 and 56. The bottom wall of each recess at 58 and 59 is axially extending for a purpose to be described hereinafter.

The transparent plastic indicator 40 comprises a plug 60 having a first diameter portion 62 received in close sliding fit within a first diameter section 64 of opening 44 and a second larger diameter portion 66 partially received in close sliding fit within a second diameter section 68. The portions 62 and 66 cooperate to form an annular shoulder 70 which opposes a similar annual shoulder 72 defined between sections 64 and 68. A resilient sealing ring 74 is disposed within a space 76 between the shoulders 70 and 72 in sealing engagement with first portion 62 and second section 68. The plug 60 also includes a pair of integrally formed resilient projections 76 and 78 which are formed with flanges 80 and 82. The flanges are biased outwardly into the respective recesses 54 and 56 to oppose the respective enlarged heads 50 and 52, thereby preventing the plug 60 from withdrawing from the opening 44. A bore 84 leads to the passage 42 to communicate fluid to a visually accessible end 85. Upon inspection of end 85, one can visually check if the fluid level is above, below, or at the location of the plug 60.

Figure 3:
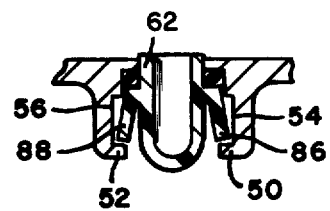
FIG. 3 is a view similar to FIG. 2 showing an alternative embodiment for carrying out the invention.

In FIG. 2 the pair of projections are biased to open facing the opening 44, whereas, in FIG. 3, the second embodiment provides a pair of resilient projections 86 and 88 which are biased to open away from the opening 44. With the second embodiment of FIG. 3, it is possible to eliminate the flanges 80 and 82 as the resilient projections 86 and 88 open into abutment with the respective enlarged heads 50 and 52.

In order to assemble the plug 60 to the reservoir, the sealing ring 74 is fitted over the first diameter portion 62 and the plug is positioned between the tabs 46 and 48 such that the projections are engaging the tabs. Next, the plug is pushed toward the inner wall 26 so that the camming action of the tabs causes the projections to bend inwardly toward the bore 84 until the projections register with the recesses 54 and 56. Once in registry with the recesses, the projections expand into the recesses to oppose the enlarged heads 50 and 52 of the tabs. To limit the movement of the plug in the direction of the inner wall 26, the shoulder 70 on the plug is engageable with the sealing ring 74 to slightly compress the latter between the shoulders 70 and 72. This compression opposes movement of the plug in the direction of the inner wall 26 to provide an indication that the projections are locked in registry with the recesses.

As mentioned earlier, the bottom walls of the recesses are parallel so that any rotation of the plug 60 causes the similarly parallel projections to be contracted inwardly toward the bore 84. This contraction creates a force on the plug opposing rotation to substantially maintain the plug in its inserted position between the pair of tabs.

Various modifications of the invention as described herein are feasible by one skilled in the art and, as such, are included within the scope of the appended claims.

I claim:

1. In a visual fluid level indicator, a housing having an outer wall extending from a base to an opening which receives the fluid, an inner wall extending from the base toward the opening to substantially form a pair of cavities for carrying the fluid and a transparent plastic plug sealingly coupled to the housing to provide a visual indication of the fluid level within the housing, characterized by said inner wall cooperating with said outer wall to define a passage extending between said pair of cavities at an intermediate location on said inner wall between said base and said opening and said outer wall including an outer wall opening intersecting said passage to communicate with said pair of cavities at a predetermined location relative to said base, said transparent plastic plug including a first diameter portion extending into said outer wall opening and a second diameter portion forming a shoulder with said first diameter portion, said outer wall also including at least one transversely extending tab, said transparent plastic plug including at least one integrally formed resilient projection cooperating with said one transversely extending tab to releasably connect said transparent plastic plug to said housing when said first diameter portion is received within said outer wall opening, said tab including an undercut recess which defines a lock spaced from said outer wall opening and said projection being biased into said undercut recess to define a locking fit spaced outwardly from said shoulder and prevent disconnection of said transparent plastic plug from said housing, and a sealing ring engaging said first diameter portion, said shoulder and said outer wall.

* * * * *